US008493878B2

(12) United States Patent
Stenfelt

(10) Patent No.: US 8,493,878 B2
(45) Date of Patent: Jul. 23, 2013

(54) FLEXIBLE PARAMETER CACHE FOR MACHINE TYPE CONNECTIONS

(75) Inventor: John Stenfelt, Gothenburg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 264 days.

(21) Appl. No.: 12/980,619

(22) Filed: Dec. 29, 2010

(65) Prior Publication Data
US 2012/0155480 A1 Jun. 21, 2012

Related U.S. Application Data

(63) Continuation of application No. PCT/EP2010/070399, filed on Dec. 21, 2010.

(51) Int. Cl.
*G01R 31/08* (2006.01)
*H04W 4/00* (2009.01)
*H04W 40/00* (2009.01)
*H04L 12/28* (2006.01)

(52) U.S. Cl.
USPC ........... 370/252; 370/329; 370/392; 370/401; 455/445

(58) Field of Classification Search
USPC .......................... 370/252, 329, 338
See application file for complete search history.

(56) References Cited

U.S. PATENT DOCUMENTS

| 2006/0133333 | A1 | 6/2006 | Alex et al. | |
| 2008/0161004 | A1 | 7/2008 | Burgess et al. | |
| 2009/0265434 | A1* | 10/2009 | Benc et al. | 709/206 |
| 2011/0069635 | A1* | 3/2011 | Low et al. | 370/254 |
| 2011/0268047 | A1* | 11/2011 | Nath et al. | 370/329 |
| 2012/0008573 | A1* | 1/2012 | Shiva et al. | 370/329 |
| 2012/0071168 | A1* | 3/2012 | Tomici et al. | 455/445 |
| 2012/0106391 | A1* | 5/2012 | van Loon et al. | 370/252 |

OTHER PUBLICATIONS

International Search Report for International Application No. PCT/EP2010/070399 dated Oct. 5, 2011.
KPN; "SIMTC pCR to Key Issue—Secure Connection", 3GPP Draft; S3-101234, 3rd Generation Partnership Project (3GPP), Nov. 8, 2010, XP050526099, the whole document.

* cited by examiner

*Primary Examiner* — Brandon Renner
(74) *Attorney, Agent, or Firm* — Nixon & Vanderhye P.C.

(57) ABSTRACT

The present invention relates to a method for improving parameter cache in a communication system, the system enabling Machine Type Communication, MTC, connection between at least one MTC device (10) and at least one MTC server (11), via a Packet Data Network, PDN, connection. The communication system for at least a first MTC connection performing the steps of:
a Gateway, GW (17), in the communication system establishing (23) a new Gx session with a Policy Control Node, PCN (15),
the PCN (15) performing (24) session binding with the GW (17),
The method is particularly characterized in that the communication system further performs the step of:
when the first MTC connection has been inactive for a certain time period, the GW (17) as part of a cache upload procedure sends (25) a first set of PDN connection parameters to the PCN (15) and releases memory resources associated with this first set of PDN connection parameters.

20 Claims, 5 Drawing Sheets

FLEXIBLE PARAMETER CACHE FOR MACHINE TYPE CONNECTIONS

This application is a continuation of International Application No. PCT/EP2010/070399 filed 21 Dec. 2010, the entire content of which is hereby incorporated by reference.

TECHNICAL FIELD

The present invention relates to a method for improving parameter cache in a communication system. It also relates to a Gateway and a Policy control node adapted for the same purpose.

BACKGROUND

Machine Type Communications (MTC) is used for automatic transmission or measurement of data from remote sources, for instance by wireless communication. A machine to machine solution includes three elements: the MTC devices, the wireless or wired carrier network (for instance a 3GPP based system), and the MTC servers.

MTC devices interconnected via wireless networks can be used to improve efficiency in various areas, such as to provide the ability for improving maintenance services. Other areas where MTC can be used are in monitor systems, such as automatic meter reading, in surveillance cameras, in vehicle fleet management and so on.

Network Improvement for Machine Type Communication, NIMTC, has been a study item in 3GPP Release 10. The study has primarily focused on architectural enhancements to the existing system to support a large number of Machine-Type Communication (MTC) devices in the network and architectural enhancements to fulfill MTC service requirements.

The study has been divided into a number of different key issues that each focus on a particular optimization. For 3GPP Release 10 some of the studied key issues have already been included into the standard. The work continues in 3GPP Release 11. This invention may be a potential solution proposal for future 3GPP releases; however it could also be used as a proprietary feature.

There are many possible use cases for machine type communications. Different scenarios and applications have their own requirements and traffic characteristics. Some applications may be tolerant to delay and only occasionally transmit very little data (e.g. meters) while other applications may require a constant (guaranteed) bit rate with real time characteristics (e.g. surveillance cameras). In addition some MTC devices can be assumed to be geographically fixed (meters) while others are mobile (fleet management).

To have a very large number of simultaneously connected devices over a 3GPP network presents a scalability problem for the GW (e.g. GGSN or PDN GW). Each so called PDN-connection will require a number of parameters to be stored in a volatile memory of the GW. The number of Simultaneously Attached Users (SAU) in a GW is thus limited by the available memory resources.

SUMMARY

The object of the present invention is therefore to improve the support for MTC connected devices in the GW without having to increase the volatile memory for parameter cache.

The object of the present invention is solved by improving parameter cache in a communication system. The system enables Machine Type Communication, MTC, connection between at least one MTC device and at least one MTC server, via a Packet Data Network, PDN, connection. The communication system for at least a first MTC connection performing the steps of:
   a Gateway, GW, in the communication system establishing a new Gx session with a Policy Control Node, PCN,
   the PCN performing session binding with the GW.
   when the first MTC connection has been inactive for a certain time period, the GW as part of a cache upload procedure sends a first set of PDN connection parameters to the PCN and releases memory resources associated with this first set of PDN connection parameters.

The object of the present invention is also solved by a Gateway, GW, in a communication system, the GW being adapted to improve parameter cache in the communication system. The system is adapted to enable Machine Type Communication, MTC, connection between at least one MTC device and at least one MTC server, via a Packet Data Network, PDN, connection. The GW for at least a first MTC connection is adapted to establish a Gx session with a Policy Control Node, PCN, in the system.

The GW is particularly characterized in that when the first MTC connection has been inactive for certain a time period, the GW as part of a cache upload procedure is adapted to send a first set of PDN connection parameters to the PCN and release memory resources associated with this first set of PDN connection parameters.

The object of the present invention is solved by a Policy Control Node, PCN, in a communication system, the PCN being adapted to improve parameter cache in the communication system. The system is adapted to enable Machine Type Communication, MTC, connection between at least one MTC device and at least one MTC server, via a Packet Data Network, PDN, connection. The PCN for at least a first MTC connection is adapted to perform session binding with a Gateway, GW, in the system.

The PCN is particularly characterized in that when the first MTC connection has been inactive for certain a time period, the PCN as part of a cache upload procedure is adapted to receive a first set of PDN connection parameters from the GW and perform caching of these parameters.

The main advantage with the present invention is the reduced memory requirements in the GW per PDN connection. A GW that is able to cache parameters in this way would potentially be able to support a significantly larger number of SAU with the assumed traffic characteristics, which is preferably infrequent communication that is tolerant to a somewhat longer transition time from idle to active communication.

Additional advantages are achieved by implementing one or several of the features of the dependent claims not mentioned above. This will be further explained below.

BRIEF DESCRIPTION OF THE DRAWINGS

The invention will be described in greater detail in the following, with reference to the embodiments that are shown in the attached drawings, in which.

DETAILED DESCRIPTION

The present invention relates to a method for improving parameter cache in a communication system. The system enables Machine Type Communication, MTC, connection between at least one MTC device and at least one MTC server, via a Packet Data Network, PDN, connection. The communication system for at least a first MTC connection performs the steps of:

1. A Gateway, GW, in the communication system establishes a new Gx session with a Policy Control Node, PCN,
2. The PCN performs session binding with the GW, A person skilled in the art would realize that a GW and a PCN, adapted to perform said method described below are also disclosed in the following.

Figure 1:
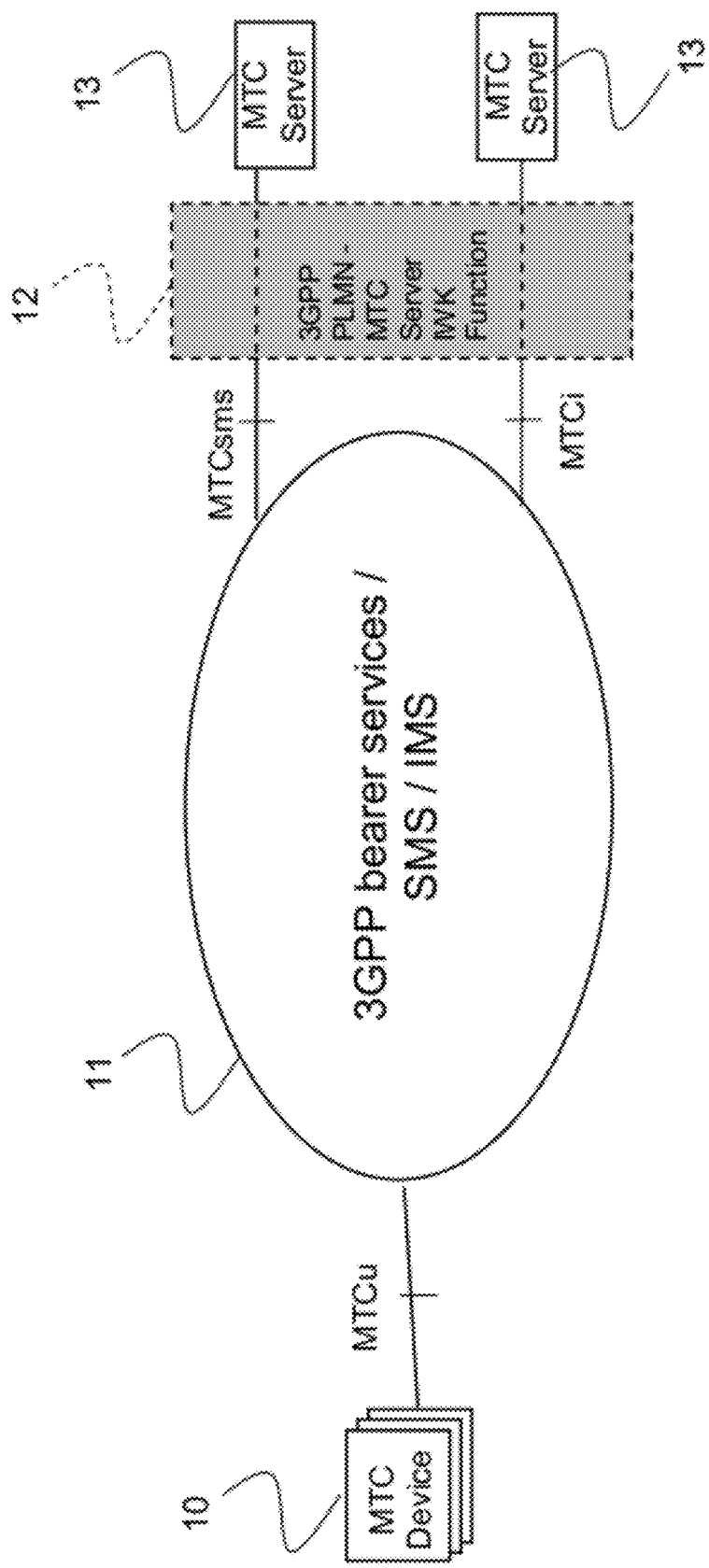
FIG. 1 illustrates a simplified overview of 3GPP architecture for Machine-Type Communication.
Figure 2:
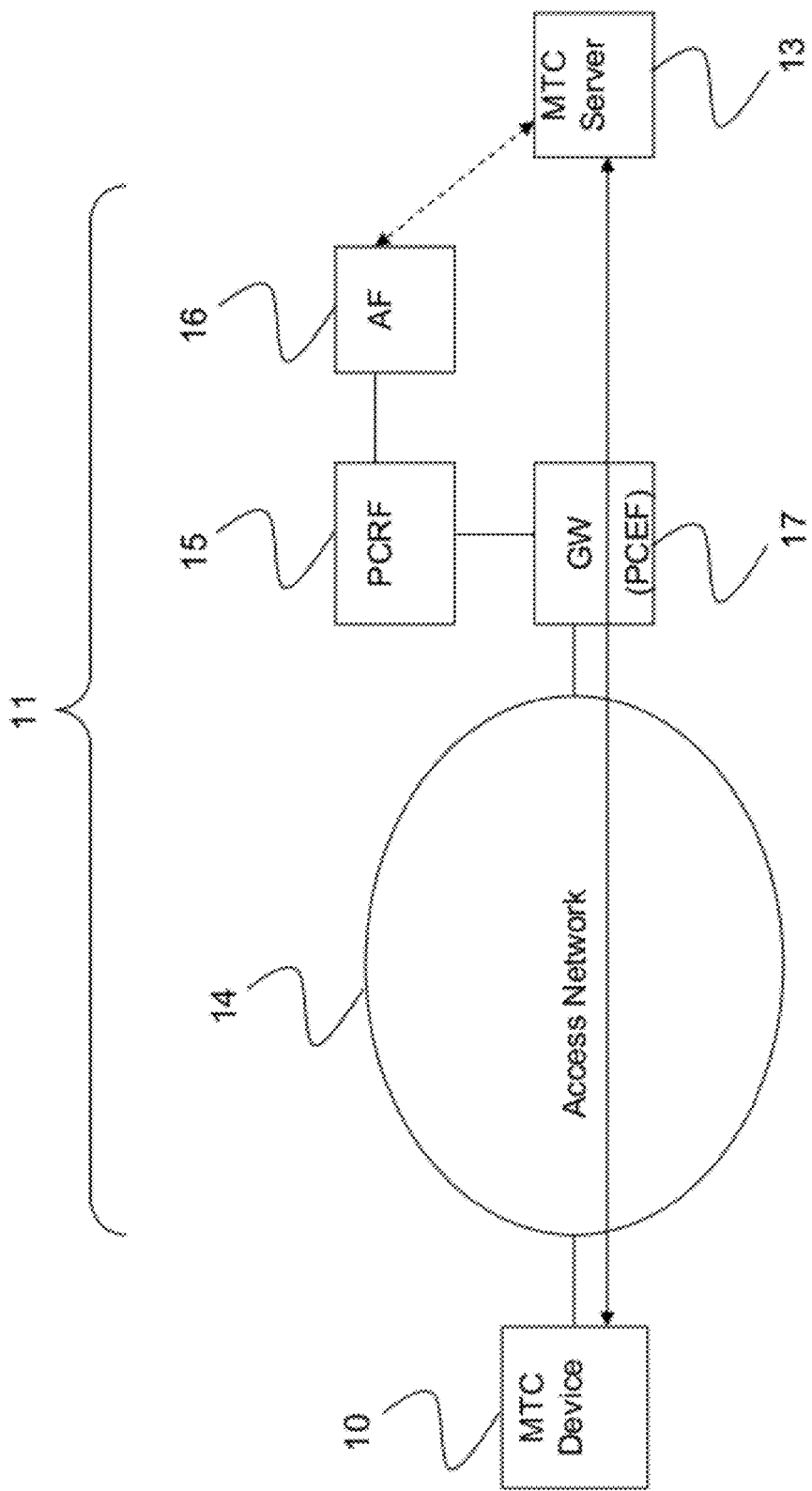
FIG. 2 illustrates the simplified overview of the 3GPP core network architecture.

FIG. 1 illustrates an example simplified overview of 3GPP architecture for Machine Type Communication while FIG. 2 illustrates a simplified overview of the 3GPP core network 11 architecture together with Policy and Charge Control (PCC) nodes and Application Function AF. The communication system referred to in the beginning includes the 3GPP architecture with the core network, the PCC nodes and the AF. In the following, the term communication system will be used to describe the 3GPP architecture between the MTC device 10 and the MTC server 13. The 3GPP PLMN-MTC-Server IWK Function has the role of coordinating the MTC data traffic and is not part of the present invention. It will therefore not be described further in the patent application. The reference points in FIG. 1 are listed as below:

MTCu It provides MTC Devices access to 3GPP network for the transport of user plane and control plane traffic. MTCu interface could be based on Uu, Um, Ww and LTE-Uu interface.

MTCi: It is the reference point that MTC Server uses to connect the 3GPP network and thus communicates with MTC Device via 3GPP bearer services/IMS. MTCi could be based on Gi, Sgi, and Wi interface.

MTCsms: It is the reference point the MTC Server uses to connect the 3GPP network and thus communicates with MTC Device via 3GPP SMS.

As shown in FIG. 1, the communication system 11 enables Machine Type Communication, MTC, connection between at least one MTC device 10 and at least one MTC server 13, via a Packet Data Network, PDN, connection (illustrated by the arrow in FIG. 2). In the following, the PDN connection is established as per standard procedures. The access network 14 could for instance be a mobile access network or WLAN. The person skilled in the art would realize that any type of access network could be used with the present invention. The access network will therefore not be described more in detail in this patent application.

The MTC devices 10 may be for instance meters or surveillance cameras. Some of them can be geographically fixed while others are mobile. There is a large variety of devices that could be used for Machine-to-Machine Communications. The MTC server 13 is as illustrated in FIGS. 1 and 2 positioned at the other end of the communication system. It for instance holds software to enable MTC with the devices and to forward data to a user. The person skilled in the art would realize that any type of MTC devices and servers could be used with the present invention and they will therefore not be described more in detail in this patent application.

FIG. 2 further illustrates a PDN-GW 17 including a Policy and Charging Enforcement Function, PCEF 17. It also shows a Policy and Charging Rules Function, PCRF 15, and an Application Function, AF 16. The GW named in the beginning is for instance a PDN-GW and the Policy Control Node named in the beginning is for instance a PCRF. A person skilled in the art would realize that the other type of GW's can be used, such as a PDN-GW or a GGSN. In the following, the most generic terms GW and PCN will be used. This means that when it is stated that the GW performs a certain activity, it may be the PCEF in the GW that performs a certain step.

The AF is utilized within PCC and its role is to dynamically transfer service information to the PCN 15 to allow the PCN to make decisions based on policy. The AF will not be described more in detail in the patent application and a person skilled in the art would realize that any type of AF can be used with the present invention.

When the PDN connection has been established the GW 17 establishes a new Gx session with the PCN 15, which performs session binding with the GW. The PDN connection is then used for MTC between one device 10 and a server 13. A problem is that when a very large number of devices are simultaneously connected over the communication system 11, scalability problem arises for the GW. Each PDN-connection will require a number of parameters to be stored in a volatile memory of the GW and the number of Simultaneously Attached Users (SAU) in the GW is thus limited by the available memory resources.

Figure 7:
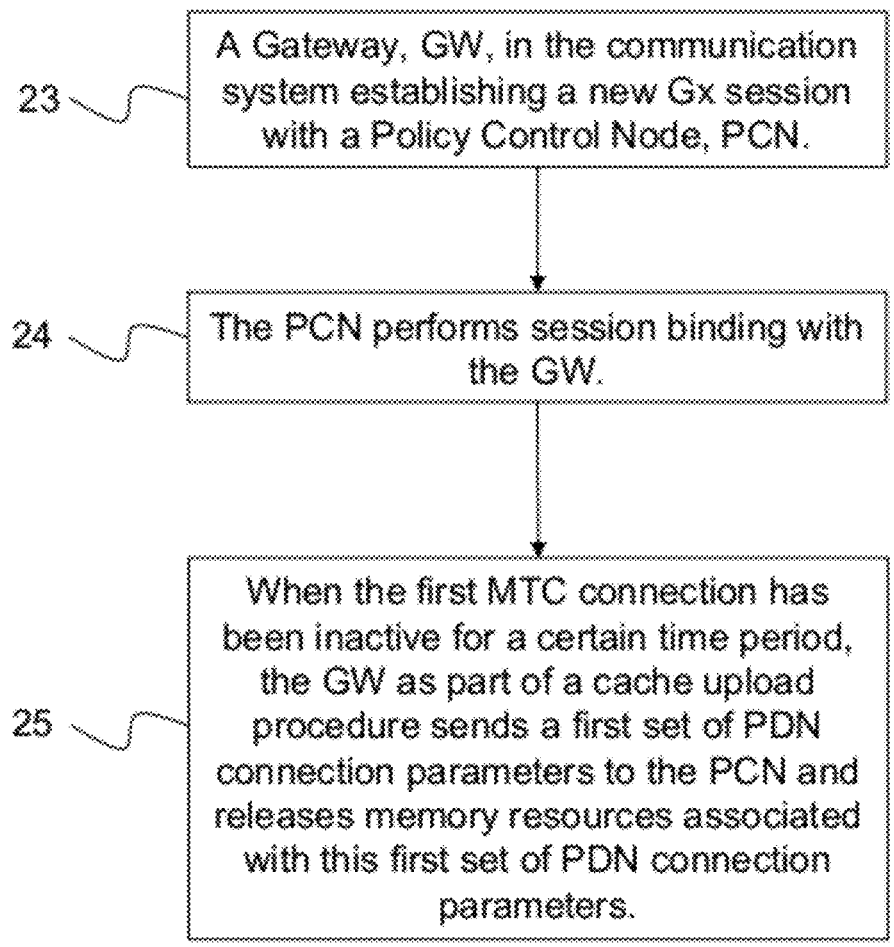
FIG. 7 illustrates the method for parameter cache according to the present invention

In order to improve the support for MTC connected devices in the GW without having to increase the volatile memory for parameter cache, the present invention performs the following steps, see FIG. 7:

1. The GW 17 in the communication system establishes 23 a new Gx session with the PCN 15.
2. The PCN performs 24 session binding with the GW
3. When the first MTC connection has been inactive for a certain time period, the GW 17 as part of a cache upload procedure sends 25 a first set of PDN connection parameters to the PCN 15 and releases memory resources associated with this first set of PDN connection parameters.

Steps 1 and 2 are part of known procedures for establishing a new Gx session. A PDN connection is already established, prior to steps 1 and 2. Step 3 is a now step introduced in the present invention.

As shown in step 3, the basic concept of the invention is consequently to offload a first set (some) of the PDN connection parameters to the PCN 15 when the first MTC connection between the MTC device and the MTC server is not in use for some time. The GW (actually the PCEF in the GW) then provides a suitable set, e.g., a first set, of parameters associated with the PDN-connection to the PCN via the Gx interface and then releases the memory resources associated with those parameters. The PCN functions as a parameter cache for the GW. The PCN then performs caching of said first set of PDN connection parameters. They could, e.g., be further stored in a non-volatile database.

The GW caches a second set of parameters for said PDN connection. Optimally only a minimum set of parameters such as Gx session Id and the GW IP-addresses and TEIDs of the PDN-connection for GTP-based core networks are kept in the GW 17. The minimum set of parameters is dependent on the core network technology used (out of scope of the invention).

The fact that the GW 17 sends parameters to the PCN 15 gives the advantage of reduced memory requirements in the GW per PDN connection. A GW that is able to cache parameters in this way would potentially be able to support a significantly larger number of SAU with the assumed traffic characteristics, which is preferably infrequent communication that is tolerant to a somewhat longer transition time from idle to active communication.

Figure 3:
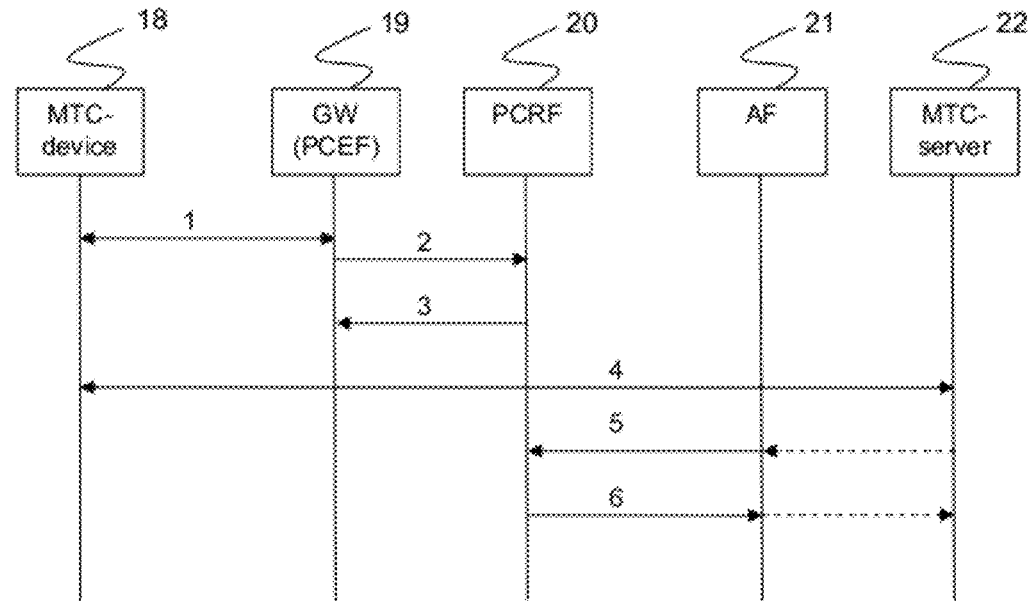
FIG. 3 illustrates a mechanism for PDN-connection establishment according to the present invention.

FIG. 3 illustrates a mechanism for PDN-connection establishment according to the present invention.

1. The PDN-connection is established as per standard procedures.
2. The GW 17 establishes a new Gx session with the PCN 15. A new procedure is that the GW indicates in the message that it supports parameter caching over Gx for this session.
3. The PCN responds to the Gx session establishment request. A new procedure is that the PCN indicates that parameter caching may be used.
4. The MTC-device 10 registers with the MTC-server 13.
5. The MTC-server establishes a Rx session with the PCN either directly or via an AF-proxy 16.
6. The PCN acknowledges the Rx session. The PCN performs session binding between the Rx session and the Gx session.

Figure 4:
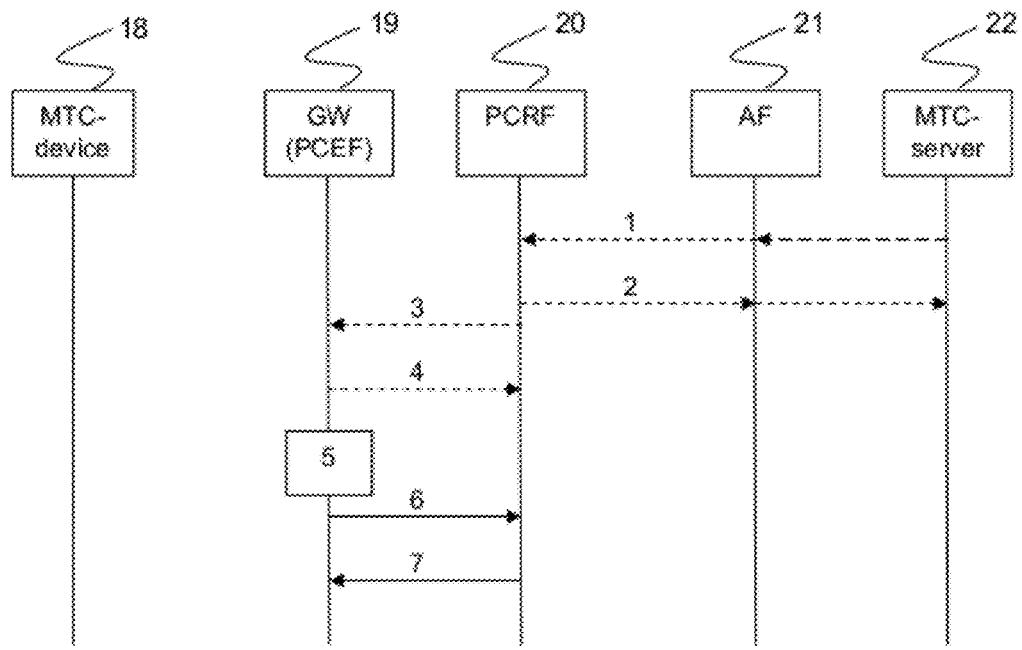
FIG. 4 illustrates a mechanism for upload of parameters according to the present invention.

The MTC server consequently establishes an Rx session directly with the PCN 15 or indirectly with the PCN via the Application Function, AF 16. FIG. 4 illustrates an example of a mechanism for upload of parameters according to the present invention.

1. If the decision is made by the MTC-server that no further communication is needed for some time, the MTC-server initiates the caching procedure by sending an Rx request to the PCN 15. The decision is preferably based on the extension a time period during which the first MTC connection has been inactive. A new procedure is that the request contains a command to initiate the cache upload procedure.
2. The PCN acknowledges the request.
3. The PCN triggers a Gx re-authorization to the GW and initiates the cache upload procedure by sending a report to the GW including an indication to the GW to initiate the cache procedure.
4. The PCEF acknowledges the request.
5. In case the MTC-server did not make the decision to initiate the cache procedure it is also a possibility that the GW itself, for instance based on no user plane activity for a certain time (inactivity timer), initiates the procedure e.g. based on
6. The GW then, as part of the cache upload procedure, sends an update request over Gx to the PCN. The request includes a new reporting reason that the request is due to a parameter cache. The GW includes the first set of PDN connection parameters to be cached.
7. The PCN acknowledges the request and the GW releases the memory resources associated with the parameters.

When there is a need for further communication via the first MTC connection, the GW 17 as part of a cache download procedure requests the PCN 15 to resend the first set of PDN connection parameters. In a first alternative, the GW, based on signalling from the MTC device, initiates the cache download procedure. In a second alternative, the MTC server 13 instead, based on the need for further communication, sends a command to the PCN to initiate the cache download procedure. In both alternatives, the PCN then initiates the cache download procedure by sending a report to the GW including information about said procedure. Once the cached parameters has been retrieved the PDN-connection functions according to standard procedures.

Figure 5:
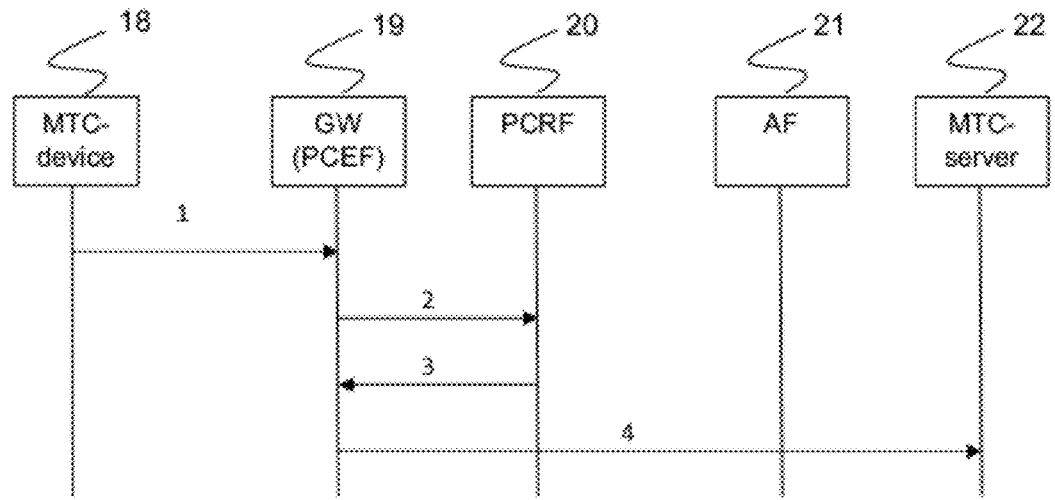
FIG. 5 illustrates a mechanism for MTC-device originated procedure for download of parameters according to the present invention.

FIG. 5 shows an example of the first alternative. In FIG. 5 the following steps are performed:

1. The MTC-devices 10 initiates communication procedures according to standard. Uplink data is received at the GW (PCEF) 17. The PDN-connection is currently in cached set of parameters to correlate the received data with a PDN-connection. Note that the procedure may also be triggered by control signaling e.g. due to RAT-change, subscription update etc. In this case step 4 does not apply.
2. The GW sends an update Gx request to the PCN 15. The Gx request contains a new reporting reason that the request is for cache retrieval. The received uplink data (or control signaling) is buffered.
3. The PCN acknowledges the Gx request. The cached parameters are included in the response. Once received this puts the PDN-connection into normal mode of operation again. The GW processes the received UL data according to standard procedures.
4. The UL data is forwarded to its destination (MTC-server).

Figure 6:
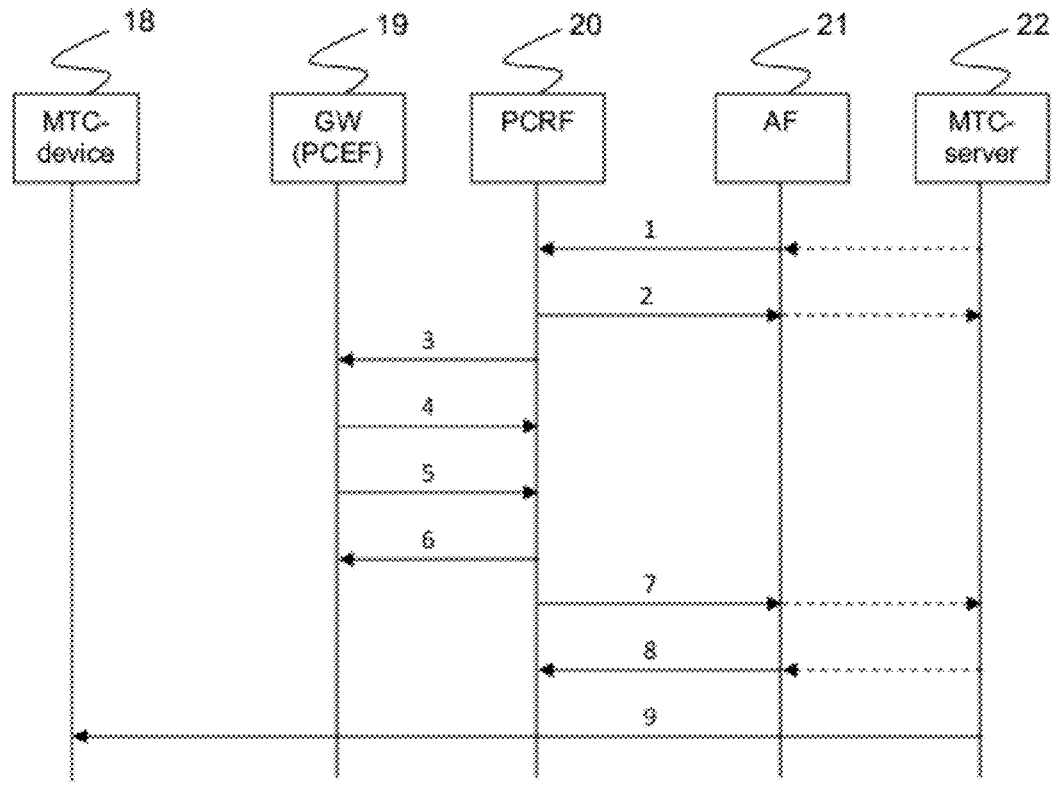
FIG. 6 illustrates a mechanism for MTC-server originated procedure for download of parameters according to the present invention.

FIG. 6 shows an example of the second alternative. In FIG. 6 the following steps are performed:

1. The MTC-server 13 decides that it needs to communicate with the MTC-device 10 and initiates the cache provisioning procedure by sending an Rx request to the PCN 15 containing a command to initiate the cache provisioning.
2. The PCN acknowledges the request.
3. The PCN triggers a Gx re-authorization to the GW 17. The message includes an indication to the GW to initiate the cache retrieval.
4. The GW acknowledges the request.
5. The GW sends an update request over Gx to the PCRF. The Gx request contains a new reporting reason that the request is for cache retrieval.
6. The PCN acknowledges the Gx request. The cached parameters are included in the response. Once received this puts the PDN-connection into normal mode of operation again.
7. The PCN notifies the MTC-server 13 over Rx that the parameter retrieval was successful.

The invention is not limited to the examples above, but may vary freely within the scope of the appended claims. For example, any type of access network could be used with the present invention. Moreover, any type of MTC devices and servers could be used with the present invention. Furthermore, any type of GW's and PCN can be used, such as a PDN-GW or a GGSN. Finally, the invention is not restricted to the type of AF proxy used.

The number of parameters to cache could be made implementation dependent and does not limit the scope of the invention. For instance, initially in an implementation only a few parameters may be cached as the first set while later on more parameters are cached.

The invention claimed is:

1. A method for providing parameter cache in a communication system, the system enabling Machine Type Communication, MTC, between at least one MTC device and at least one MTC server, via a Packet Data Network, PDN, connection, the communication system for at least a first MTC connection performing the steps of:

a Gateway, GW, in the communication system establishing a new Gx session with a Policy Control Node, PCN, the PCN performing session binding with the GW, when the first MTC connection has been inactive for a certain time period, the GW as part of a cache upload procedure sends a first set of PDN connection parameters to the PCN and releases memory resources associated with caching this first set of PDN connection parameters at the GW.

2. The method according to claim 1, wherein the first MTC connection is inactive when there is no user plane activity.

3. The method according to claim 1, wherein the MTC server, based on the inactivity time period, sends a command to the PCN to initiate the cache upload procedure.

4. The method according to claim 3, wherein the PCN initiates the cache upload procedure by sending a report to the GW including an indication to the GW to initiate the cache procedure.

5. The method according to claim 1, wherein the GW based on the extension of the time period initiates the cache upload procedure.

6. The method according to claim 1, the GW caches a second set of parameters for said PDN connection.

7. The method according to claim 1, wherein the PCN performs caching of said first set of PDN connection parameters.

8. The method according to claim 1, wherein when there is a need for further communication via the first MTC connection, the GW as part of a cache download procedure requests the PCN to resend the first set of PDN connection parameters.

9. The method according to claim 8, wherein the MTC server based on the need for further communication sends a command to the PCN to initiate the cache download procedure.

10. The method according to claim 8, wherein the GW based on signalling from the MTC device initiates the cache download procedure.

11. The method according to claim 9, wherein the PCN initiates the cache download procedure by sending a report to the GW including information about said procedure.

12. The method according to claim 9, wherein the MTC server establishes an Rx session directly with the PCN or indirectly with the PCN via an Application Function, AF.

13. A Gateway, GW, including one or more GW computers which are configured to provide parameter caching in a communication system that provides Machine Type Communication, MTC, between at least one MTC device and at least one MTC server, via a Packet Data Network, PDN, connection, the one or more GW computers being configured to establish a Gx session with a Policy Control Node, PCN (15), in the communication system for a first MTC connection, wherein when the first MTC connection has been inactive for certain a time period, the one or more GW computers as part of a cache upload procedure are configured to send a first set of PDN connection parameters to the PCN release memory resources associated with caching first set of PDN connection parameters at the one or more GW computers.

14. The GW according to claim 13, wherein the one or more GW computers, based on the inactive time period, are configured to initiate the cache upload procedure.

15. The GW according to claim 13, wherein the one or more GW computers are configured to cache a second set of parameters for said PDN connection.

16. The GW according to claim 13, wherein when there is a need for further communication via the first MTC connection, the one or more GW computers, as part of a cache download procedure, are configured to request the PCN resend the first set of PDN connection parameters to the one or more GW computers.

17. The GW according to claim 16, wherein one or more GW computers, based on signalling from the MTC device, are configured to initiate the cache download procedure.

18. A Policy Control Node, PCN including one or more PCN computers configured to provide parameter caching in a communication system that provides Machine Type Communication, MTC, between at least one MTC device and at least one MTC server, via a Packet Data Network, PDN, for a first MTC connection, the one or more PCN computers being configured to perform session binding with a Gateway, GW, in the communications system, wherein when the first MTC connection has been inactive for certain a time period, the one or more PCN computers, as part of a cache upload procedure, are configured to receive a first set of PDN connection parameters from the GW and perform caching of the first set of PDN connection parameters in order to free up memory resources used to store the first set of PDN connection parameters at the GW.

19. The PCN according to claim 18, wherein the PCN is configured to initiate the cache upload procedure by sending a report to the GW including information about the cache upload procedure.

20. The PCN according to claim 18, wherein when there is a need for further communication via the first MTC connection, the one or more PCN computers are configured to initiate a cache download procedure by sending a report to the GW including information about said cache download procedure.

* * * * *

UNITED STATES PATENT AND TRADEMARK OFFICE
CERTIFICATE OF CORRECTION

PATENT NO. : 8,493,878 B2
APPLICATION NO. : 12/980619
DATED : July 23, 2013
INVENTOR(S) : Stenfelt Page 1 of 2

It is certified that error appears in the above-identified patent and that said Letters Patent is hereby corrected as shown below:

On the Title Page, in item (57), under "ABSTRACT", in Column 2, Lines 4-5, delete "MTC server (11)," and insert -- MTC server (13), --, therefor.

On the Title Page, in item (57), under "ABSTRACT", in Column 2, Line 12, delete "(17)," and insert -- (17). --, therefor.

In the Specification

In Column 2, Line 23, delete "for certain a time period," and insert -- for a certain time period, --, therefor.

In Column 2, Line 39, delete "for certain a time period," and insert -- for a certain time period, --, therefor.

In Column 3, Line 8, delete "invention" and insert -- invention. --, therefor.

In Column 3, Line 22, delete "GW," and insert -- GW. --, therefor.

In Column 3, Line 40, delete "MTCu" and insert -- MTCu: --, therefor.

In Column 4, Line 41, delete "GW" and insert -- GW. --, therefor.

In Column 5, Line 52, delete "on" and insert -- on. --, therefor.

In Column 6, Line 11, delete "cached set" and insert -- cached mode and the GW uses the available (minimum) second set --, therefor.

Signed and Sealed this
Thirty-first Day of December, 2013

Margaret A. Focarino
*Commissioner for Patents of the United States Patent and Trademark Office*

CERTIFICATE OF CORRECTION (continued)
U.S. Pat. No. 8,493,878 B2

In the Claims

In Column 7, Line 50, in Claim 13, delete "PCN (15)," and insert -- PCN, --, therefor.

In Column 8, Line 2, in Claim 13, delete "for certain a time period," and insert -- for a certain time period, --, therefor.

In Column 8, Lines 4-5, in Claim 13, delete "PCN release" and insert -- PCN and release --, therefor.

In Column 8, Line 5, in Claim 13, delete "with caching first" and insert -- with caching this first --, therefor.

In Column 8, Lines 18-19, in Claim 16, delete "PCN resend" and insert -- PCN to resend --, therefor.

In Column 8, Line 21, in Claim 17, delete "wherein one" and insert -- wherein the one --, therefor.

In Column 8, Line 24, in Claim 18, delete "PCN" and insert -- PCN, --, therefor.

In Column 8, Line 33, in Claim 18, delete "for certain a time period," and insert -- for a certain time period, --, therefor.